(12) United States Patent
Takami et al.

(10) Patent No.: US 12,350,737 B2
(45) Date of Patent: Jul. 8, 2025

(54) REFRACTORY PRODUCT

(71) Applicant: KROSAKIHARIMA CORPORATION, Fukuoka (JP)

(72) Inventors: Kouhei Takami, Fukuoka (JP); Katsumi Morikawa, Fukuoka (JP); Shigefumi Matsumoto, Fukuoka (JP)

(73) Assignee: KROSAKIHARIMA CORPORATION, Fukuoka (JP)

( * ) Notice: Subject to any disclaimer, the term of this patent is extended or adjusted under 35 U.S.C. 154(b) by 533 days.

(21) Appl. No.: 17/780,392

(22) PCT Filed: Dec. 8, 2020

(86) PCT No.: PCT/JP2020/045737
§ 371 (c)(1),
(2) Date: May 26, 2022

(87) PCT Pub. No.: WO2021/117742
PCT Pub. Date: Jun. 17, 2021

(65) Prior Publication Data
US 2023/0028785 A1   Jan. 26, 2023

(30) Foreign Application Priority Data
Dec. 10, 2019  (JP) ................. 2019-223106

(51) Int. Cl.
*B22D 41/54*   (2006.01)
*C04B 35/106*  (2006.01)
*C04B 38/00*   (2006.01)

(52) U.S. Cl.
CPC ........... *B22D 41/54* (2013.01); *C04B 35/106* (2013.01); *C04B 38/0054* (2013.01);
(Continued)

(58) Field of Classification Search
None
See application file for complete search history.

(56) References Cited

U.S. PATENT DOCUMENTS 8,186,824 B2  5/2012  Fujita
8,349,752 B2  1/2013  Shin et al.
(Continued)

FOREIGN PATENT DOCUMENTS

CA   3037462 C  *  4/2021  ............ B22D 11/00
JP   11-199328 A    7/1999
(Continued)

OTHER PUBLICATIONS

International Preliminary Report on Patentability, dated May 17, 2022, with Written Opinion for PCT/JP2020/045737, filed Dec. 8, 2020 (English translation).
(Continued)

*Primary Examiner* — Elizabeth Collister
(74) *Attorney, Agent, or Firm* — Paul D. Bianco; Fleit Intellectual Property Law (57) ABSTRACT

Provided is a refractory product which is not impregnated with pitch or the like, wherein it has higher corrosion-erosion resistance and thermal shock resistance as compared to a refractory product subjected to pitch or the like-impregnation treatment. The refractory product which is not impregnated with tar or pitch is characterized in that, in terms of values of physical properties of a sample of the refractory product as measured after heat-treating the sample in a non-oxidizing atmosphere at 1200° C.: an apparent porosity is 7% or less; a total void volume of pores having a pore diameter of 1 μm or less is 80% or more of an integrated void volume of pores of the entire sample of the refractory product; and a gas permeability is $50 \times 10^{-17}$ m² or less.

6 Claims, 5 Drawing Sheets

(52) U.S. Cl.
CPC .............. *C04B 2235/3217* (2013.01); *C04B 2235/3244* (2013.01); *C04B 2235/3821* (2013.01); *C04B 2235/3826* (2013.01); *C04B 2235/54* (2013.01); *C04B 2235/9607* (2013.01); *C04B 2235/9684* (2013.01)

(56) References Cited

U.S. PATENT DOCUMENTS

| | | |
|---|---|---|
| 10,766,783 B2 | 9/2020 | Chikazawa |
| 11,192,825 B2 | 12/2021 | Makino |

FOREIGN PATENT DOCUMENTS

| | | |
|---|---|---|
| JP | 2001-151558 A | 6/2001 |
| JP | 2002-362969 A | 12/2002 |
| JP | 2003-171187 A | 6/2003 |
| JP | 2014-169214 A | 9/2014 |
| JP | 2014-206309 A | 10/2014 |
| WO | 2009/119683 A1 | 10/2009 |
| WO | 2018/056456 A1 | 3/2018 |
| WO | 2018/061731 A1 | 4/2018 |
| WO | 2018/155030 A1 | 8/2018 |

OTHER PUBLICATIONS

International Search Report dated Jan. 25, 2021 for PCT/JP2020/045737 filed Dec. 8, 2020.
Written Opinion for PCT/JP2020/045737 filed Dec. 8, 2020.

\* cited by examiner

FIG. 1

| TABLE 1 | Inventive Example 1 | Inventive Example 2 | Inventive Example 3 | Inventive Example 4 | Inventive Example 5 | Comparative Example 1 | Comparative Example 2 | Comparative Example 3 | Comparative Example 4 | Comparative Example 5 |
|---|---|---|---|---|---|---|---|---|---|---|
| Chemical Components [% by mass] | | | | | | | | | | |
| $Al_2O_3$ | 80 | 80 | 80 | 80 | 80 | 80 | 80 | 80 | 80 | 80 |
| $ZrO_2$ | 10 | 10 | 10 | 10 | 10 | 10 | 10 | 10 | 10 | 10 |
| $SiO_2$ | 3 | 3 | 3 | 3 | 3 | 3 | 3 | 3 | 3 | 3 |
| C | 3 | 3 | 3 | 3 | 3 | 3 | 3 | 3 | 3 | 3 |
| Total amount of SiC and $B_4C$ | 2 | 2 | 2 | 2 | 2 | 2 | 2 | 2 | 2 | 2 |
| Total amount of Al, Si and Mg | 2 | 2 | 2 | 2 | 2 | 2 | 2 | 2 | 2 | 2 |
| Pitch or the like-impregnation treatment (including caulking after impregnation) | w/o | w/o | w/o | w/o | w/o | w/o | w/o | w/o | w/o | Once |
| Apparent Porosity [%] | 4.4 | 5.1 | 5.3 | 6.3 | 6.9 | 7.1 | 7.6 | 8.5 | 9 | 5.5 |
| Percent [%] of integrated void volume of pores accounted for by void volume of pores having pore diameter of 1 μm or less | 95 | 93 | 86 | 88 | 84 | 79 | 70 | 62 | 55 | 90 |
| Gas Permeability ×$10^{-17}$ [$m^2$] | 28 | 40 | 50 | 47 | 50 | 53 | 61 | 72 | 80 | 30 |
| Weibull modulus [-] | 17.6 | 16.2 | 15 | 15.2 | 15 | 14.1 | 12.5 | 14 | 13.3 | 13 |
| Average Strebgth Ratio [-] | 1.00 | 1.00 | 1.00 | 1.00 | 0.97 | 0.90 | 0.69 | 0.84 | 0.80 | 0.79 |
| Vf/Vr | 1.2 | 1.2 | 1.2 | 1.2 | 1.2 | 1.2 | 1.2 | 1.2 | 1.2 | 1.2 |
| Vf ÷ Vr | 55 | 55 | 55 | 55 | 55 | 55 | 55 | 55 | 55 | 55 |
| Covered state of particles having particle size of 1 mm or more W/ or w/o covering layer ○: w/, ×: w/o | ○ | ○ | ○ | ○ | ○ | ○ | ○ | ○ | ○ | ○ |
| Evaluation | | | | | | | | | | |
| Thermal shock resistance | △ | ○ | ○ | ○ | ○ | ○ | ○ | ○ | ○ | × |
| Surface roughness | ○ | ○ | ○ | ○ | △ | × | × | × | × | × |
| Corrosion-erosion resistance (to CaO) | ○ | ○ | ○ | ○ | △ | × | × | × | × | ○ |
| Corrosion-erosion resistance (to FeO) | ○ | ○ | ○ | ○ | △ | × | × | × | × | ○ |
| Comprehensive Evaluation | ○ | ○ | ○ | ○ | ○ | × | × | × | × | × |

FIG. 2

| TABLE 2 | Comparative Example 6 | Inventive Example 6 | Inventive Example 2 | Inventive Example 7 | Inventive Example 3 | Comparative Example 7 |
|---|---|---|---|---|---|---|
| Chemical Components [% by mass] | | | | | | |
| Al₂O₃ | 80 | 80 | 80 | 80 | 80 | 80 |
| ZrO₂ | 10 | 10 | 10 | 10 | 10 | 10 |
| SiO₂ | 3 | 3 | 3 | 3 | 3 | 3 |
| C | 3 | 3 | 3 | 3 | 3 | 3 |
| Total amount of SiC and B₄C | 2 | 2 | 2 | 2 | 2 | 2 |
| Total amount of Al, Si and Mg | 2 | 2 | 2 | 2 | 2 | 2 |
| Pitch or the like-impregnation treatment (including caulking after impregnation) | w/o | w/o | w/o | w/o | w/o | w/o |
| Apparent Porosity [%] | 7.8 | 6.5 | 5.1 | 5.1 | 6.5 | 7.5 |
| Percent [%] of integrated void volume of pores accounted for by void volume of pores having pore diameter of 1 μm or less | 73 | 84 | 93 | 94 | 81 | 70 |
| Gas Permeability ×10⁻¹⁷ [m²] | 55 | 48 | 40 | 38 | 46 | 51 |
| Weibull modulus [-] | 14 | 15.3 | 16.2 | 18.1 | 15.1 | 13.8 |
| Average Strength Rratio [-] | 0.88 | 1.00 | 1.00 | 1.00 | 0.90 | 0.83 |
| Vf/Vr | 0.9 | 1.0 | 1.2 | 1.3 | 1.6 | 1.65 |
| Vf + Vr | 55 | 55 | 55 | 55 | 55 | 55 |
| Covered state of particles having particle size of 1 mm or more W/ or w/o covering layer ○: w/, ×: w/o | × | ○ | ○ | ○ | ○ | ○ |
| Evaluation | | | | | | |
| Thermal shock resistance | ○ | ○ | ○ | ○ | △ | △ |
| Surface roughness | × | △ | ○ | ○ | ○ | × |
| Corrosion-erosion resistance (to CaO) | × | △ | ○ | ○ | △ | × |
| Corrosion-erosion resistance (to FeO) | × | ○ | ○ | ○ | △ | × |
| Comprehensive Evaluation | × | ○ | ○ | ○ | ○ | × |

FIG. 3

| TABLE 3 | Comparative Example 8 | Inventive Example 9 | Inventive Example 2 | Inventive Example 10 | Inventive Example 11 | Comparative Example 9 | Comparative Example 10 |
|---|---|---|---|---|---|---|---|
| Chemical Components [% by mass] | | | | | | | |
| $Al_2O_3$ | 80 | 80 | 80 | 80 | 80 | 80 | 80 |
| $ZrO_2$ | 10 | 10 | 10 | 10 | 10 | 10 | 10 |
| $SiO_2$ | 3 | 3 | 3 | 3 | 3 | 3 | 3 |
| C | 3 | 3 | 3 | 3 | 3 | 3 | 3 |
| Total amount of SiC and $B_4C$ | 2 | 2 | 2 | 2 | 2 | 2 | 2 |
| Total amount of Al, Si and Mg | 2 | 2 | 2 | 2 | 2 | 2 | 2 |
| Pitch or the like-impregnation treatment (including caulking after impregnation) | w/o | w/o | w/o | w/o | w/o | w/o | w/o |
| Apparent Porosity [%] | 6.3 | 6.1 | 5.1 | 4.7 | 6.0 | 7.1 | 7.4 |
| Percent [%] of integrated void volume of pores accounted for by void volume of pores having pore diameter of 1 μm or less | 75 | 80 | 93 | 96 | 96 | 96 | 96 |
| Gas Permeability ×$10^{-17}[m^2]$ | 55 | 46 | 40 | 30 | 42 | 51 | 53 |
| Weibull modulus [-] | 14 | 15.1 | 16.2 | 16.8 | 17.5 | 18.5 | 19 |
| Average Strength Rratio [-] | 0.88 | 1.00 | 1.00 | 1.00 | 1.00 | 1.00 | 1.00 |
| Vf/Vr | 1.2 | 1.2 | 1.2 | 1.2 | 1.2 | 1.2 | 1.2 |
| Vf + Vr | 48 | 50 | 55 | 75 | 80 | 82 | 85 |
| Covered state of particles having particle size of 1 mm or more W/ or w/o covering layer ○: w/, ×: w/o | × | ○ | ○ | ○ | ○ | ○ | ○ |
| Evaluation | | | | | | | |
| Thermal shock resistance | △ | ○ | ○ | ○ | ○ | ○ | ○ |
| Surface roughness | × | ○ | ○ | ○ | ○ | × | × |
| Corrosion-erosion resistance (to CaO) | × | △ | ○ | ○ | △ | × | × |
| Corrosion-erosion resistance (to FeO) | × | △ | ○ | ○ | △ | × | × |
| Comprehensive Evaluation | × | ○ | ○ | ○ | ○ | × | × |

FIG. 4

| TABLE 4 | Inventive Example 12 | Inventive Example 13 | Inventive Example 14 | Inventive Example 15 | Inventive Example 2 | Inventive Example 16 | Inventive Example 17 | Inventive Example 18 |
|---|---|---|---|---|---|---|---|---|
| Chemical Components [% by mass] | | | | | | | | |
| $Al_2O_3$ | 71 | 72 | 79 | 79 | 80 | 82 | 83 | 84 |
| $ZrO_2$ | 9 | 9 | 8 | 9 | 10 | 10 | 10 | 11 |
| $SiO_2$ | 3 | 3 | 3 | 3 | 3 | 3 | 3 | 3 |
| C | 7 | 7 | 3 | 3 | 3 | 2 | 1 | 1 |
| Total amount of SiC and $B_4C$ | 3 | 4 | 3 | 3 | 2 | 2 | 1 | 1 |
| Total amount of Al, Si and Mg | 7 | 5 | 4 | 3 | 2 | 1 | 1 | 0 |
| Pitch or the like-impregnation treatment (including caulking after impregnation) | w/o | w/o | w/o | w/o | w/o | w/o | w/o | w/o |
| Apparent Porosity [%] | 3.1 | 3.8 | 4.4 | 4.7 | 5.1 | 5.7 | 5.8 | 7 |
| Percent [%] of integrated void volume of pores accounted for by void volume of pores having pore diameter of 1 μm or less | 96 | 95 | 95 | 94 | 93 | 91 | 88 | 81 |
| Gas Permeability ×$10^{-17}$[$m^2$] | 30 | 37 | 38 | 39 | 40 | 44 | 46 | 50 |
| Weibull modulus [-] | 18.5 | 16.4 | 16.4 | 16.3 | 16.2 | 15.6 | 14.9 | 13.2 |
| Average Strength Rratio [-] | 1.00 | 1.00 | 1.00 | 1.00 | 1.00 | 1.00 | 0.95 | 0.82 |
| Vf/Vr | 1.2 | 1.2 | 1.2 | 1.2 | 1.2 | 1.2 | 1.2 | 1.2 |
| Vf + Vr | 55 | 55 | 55 | 55 | 55 | 55 | 55 | 55 |
| Covered state of particles having particle size of 1 mm or more W/ or w/o covering layer ○: w/, ×: w/o | ○ | ○ | ○ | ○ | ○ | ○ | ○ | ○ |
| Evaluation | | | | | | | | |
| Thermal shock resistance | △ | △ | ○ | ○ | ○ | ○ | ○ | △ |
| Surface roughness | △ | ○ | ○ | ○ | ○ | ○ | ○ | △ |
| Corrosion-erosion resistance (to CaO) | △ | ○ | ○ | ○ | ○ | ○ | ○ | ○ |
| Corrosion-erosion resistance (to FeO) | △ | ○ | ○ | ○ | ○ | ○ | ○ | ○ |
| Comprehensive Evaluation | ○ | ○ | ○ | ○ | ○ | ○ | ○ | ○ |

FIG. 5

REFRACTORY PRODUCT

TECHNICAL FIELD

The present invention relates to a refractory product which is not impregnated with tar, pitch or the like, and particularly to a refractory product for a sliding nozzle used for performing control of the flow rate of molten steel, etc., during discharge of the molten steel from a ladle or tundish in continuous casting of steel, or a nozzle installed on an upstream or downstream side of the sliding nozzle to form a molten steel-passing path (these nozzles will hereinafter be also referred to correctively and simply as "nozzle")

BACKGROUND ART

The following description will be made by referring to a refractory product for a sliding nozzle mainly used for continuous casting, more specifically, by referring to a sliding nozzle plate (hereinafter also referred to as "SNP").

The SNP is a plate-shaped refractory product which is formed with a molten steel-passing hole around the center thereof, and used in a sliding nozzle when pouring molten steel from a ladle to a tundish, or from the tundish to a mold. The sliding nozzle comprises a stack of two or three SNPs, and is configured to slide one of the SNPs to adjust the degree of overlap between the molten steel-passing holes, i.e., the degree of opening, thereby controlling the flow rate of molten steel.

The SNPs are housed in a sliding nozzle device (hereinafter also referred to as "SN device") comprising a metal frame having a sliding function and/or a pressure-applying function, and used in a constrained environment where a pressure is applied to each of the SNPs from a lateral direction (direction perpendicular to a side surface thereof), simultaneously with a contact surface pressure.

The SNP is used under harsh conditions where a high-temperature fluid passes through the hole thereof in the constrained environment, and it is often the case that casting is performed in a state in which the degree of overlap between the molten steel-passing holes is reduced, so-called "narrowed or restricted pouring", during the flow rate adjustment. Thus, since a portion of the SNP around the molten steel-passing hole will be exposed to high-temperature molten steel in a negative pressure environment caused by the flow velocity of the molten steel, damage of the SNP will be significant. The damage of the SNP includes chemical damage and physical damage which progress simultaneously.

As the chemical damage, due to a combination of dissolved loss caused by a contact reaction with slag-based inclusions contained in molten steel, and a corrosive-erosive action of a gasified component having a high vapor pressure, such as Ca among components of the molten steel, in a negative pressure environment, against the portion of the SNP around the molten steel-passing hole, wear around the molten steel-passing hole progresses. Further, in such a negative pressure environment, sublimation of an easily-gasifiable component constituting the SNP causes the progression of an embrittlement reaction arising from porousification of the microstructure of the SNP, and thus the progression of the phenomenon that a sliding surface of the SNP is roughened. In addition, gas-phase oxidation also progresses in an area exposed to a high-temperature oxidizing atmosphere. The above chemical wear phenomenon causes the progression of dissolved loss around the molten steel-passing hole, surface roughness of the sliding surface, and metal infiltration arising from oxidation, over casting time, which will hinder control of the flow rate of molten steel.

As the physical damage, particularly in a SNP for a ladle or the like to be used in a casting environment where large thermal shocks are applied thereto, there is a phenomenon that radial cracks occur around the molten steel-passing hole of the SNP, or chipping occurs in edge portions of the SNP around the molten steel-passing hole (such chipping will hereinafter be also referred to as "edge chipping").

Since the SNP is used in the constrained environment, it requires sufficient strength and elastic modulus enough to be resistant to deformation and cracking. Since the occurrence of cracks impairs a gas sealing property of the SNP, it can promote the chemical damage and thus the metal infiltration and dissolved loss locally progress around cracked parts, which will hinder the flow rate control, and is likely to lead to leakage of molten steel, in some cases.

As above, in order to maintain the flow rate control function of a SNP for a long period of time, the SNP requires well-balanced quality of strength property for suppressing the chemical damage and suppressing cracking and deformation.

As means to mainly suppress such chemical damage, for example, in the below-mentioned Patent Document 1, there are disclosed: a plate brick for a sliding nozzle device, which is obtained by: preparing a shaped body formed of a mixture of a refractory material containing metal powders and 1 to 10% by mass of carbon raw material, and an organic binder; burning the shaped body in a weak oxidizing atmosphere whose oxygen partial pressure is adjusted to 10 to 10000 ppm, at a temperature of 700 to 1500° C. for 6 to 48 hours; and subjecting the resulting body to impregnation with tar and then caulking treatment; and a production method for the plate brick.

In the below-mentioned Patent Document 2, there is disclosed a plate brick which is characterized in that it is composed of a carbon-free, magnesia-alumina based spinel having a composition of 40 to 80% by mass of alumina, 20 to 60% by mass of magnesia, and 8.0% by mass or less of unavoidable impurities, wherein the plate brick has a dynamic elastic modulus of 40 GPa or more, and wherein the plate brick is subjected to pitch or tar-impregnation treatment. Further, in paragraph [0039] of the Patent Document 2, there is the following description: "The impregnation treatment can be performed by immersing the plate brick after burning in a tar or pitch melting bath preliminarily set at a given temperature of 100 to 400° C., wherein the impregnation treatment may be performed after performing degassing treatment for removing air in the plate brick. Further, the impregnation step and an additional burning step may be repeated plural times", and in Examples, there is also disclosed an example in which the impregnation step is repeatedly performed twice.

In the below-mentioned Patent Document 3, there is disclosed a method of producing a plate refractory product for a sliding nozzle, which comprises: forming a refractory raw material into a shaped body having a given shape; burning the shaped body; and then subjecting the resulting burned product to pitch-impregnation treatment and heat treatment, wherein the method is characterized in that pitch or the like used in the pitch-impregnation treatment has a quinoline insoluble content of 1% by mass or less and a fixed carbon amount of 25% by mass or more.

Differently from the techniques disclosed in the Patent Documents 1 to 3 in which impregnating a refractory body with tar, pitch or the like is used as primary means to suppress the chemical damage, for example, in the below-mentioned Patent Document 4, with a view to obtaining a slide gate plate having low porosity and excellent corrosion-erosion resistance, without performing any impregnation, there is disclosed a carbon-containing slide gate plate in which a refractory inorganic raw material, a carbonaceous raw material and a metallic raw material form a continuous particle size distribution system having a particle size of 0.1 μm to 4,000 μm, wherein the continuous particle size distribution system is adjusted such that, when particle sizes therein are divided by the square root of 2 in order from the largest particle size to the smallest particle size, and then segmented into a plurality of particle size distributions, the volume ratio r between two groups of particles included in respective particle size ranges of mutually adjacent ones of the particle size distributions (i.e., a value derived from dividing the percent by volume of particles included in a relatively larger particle size range by the percent by volume of particles included in an adjacent and smaller particle size range) falls within the range of 0.8 to 1.4.

CITATION LIST

Patent Document

Patent Document 1: JP-A 2003-171187
Patent Document 2: JP-A 2002-362969
Patent Document 3: JP-A 2014-206309
Patent Document 4: JP-A H11-199328

SUMMARY OF INVENTION

Technical Problem

In a SNP production method comprising a commonly-used burning step, a refractory product is produced by: forming a mixture into a shaped body by means of friction press or oil press; and then subjecting the shaped body to heat treatment in a non-oxidizing atmosphere at about 500 to 1400° C. (such a refractory product will hereinafter be also referred to as "just-burned product").

In such a just-burned product, the chemical damage is liable to occur, and in long-time casting, the flow rate control is liable to become difficult along with the progression of fusion/peeling or surface roughness during sliding. Therefore, it is common practice to subject the just-burned product to a densification treatment, based on a treatment comprising: immersing the just-burned product in pitch, tar or the like (hereinafter also referred to collectively as "pitch or the like") in liquid form; and causing pitch or the like to impregnate open pores existing among particles by means of vacuum impregnation, pressure impregnation or the like (this treatment will hereinafter be also referred to as "pitch or the like-impregnation treatment").

After completion of the first pitch or the like-impregnation treatment, a caulking treatment may be generally performed at a temperature of 400 to 800° C., for the purpose of removing a harmful, pitch-derived, volatile component, or of allowing pitch or the like to sufficiently impregnate a deep part of the microstructure of the refractory product during the second pitch or the like-impregnation treatment. The pitch or the like-impregnation treatment is performed once or, in some cases, plural times, and the caulking treatment is performed in conjunction with the pitch or the like-impregnation treatment, or on an as-needed basis.

The apparent porosity of the refractory product after the pitch or the like-impregnation treatment and the caulking treatment is generally about 1 to 7%, which means that the pitch or the like-impregnation treatment or the like is effective as means to provide improved denseness.

Further, the pitch or the like-impregnation treatment has an advantage, in terms of production, of being able to complement or restore variations in the quality or microstructure of a just-burned product, thereby providing higher quality. This is considered to be another reason that the pitch or the like-impregnation treatment is commonly used.

On the other hand, the pitch or the like-impregnation treatment has the following problem.

(1) Harmful volatile components, such as benzopyrene, generated during production and during use exert a negative influence on the human body and the environment.

Further, a refractory product subjected to the pitch or the like-impregnation treatment has the following problems.

(2) Pitch or the like-derived residual carbon existing in open pores in the microstructure of the refractory product has a certain advantageous effect of suppressing the penetration of slag components of molten steel into the microstructure and suppressing a sliding resistance. However, it is difficult to maintain the effect, because the pitch or the like-derived residual carbon dissolves in molten steel in a short time by contact with molten steel, and is easily oxidized and lost by an oxidizing gas.

(3) Since thermal shock resistance is reduced by the pitch or the like-impregnation treatment, cracks become more likely to occur radially around the molten steel-passing hole, and metal penetration and local chemical damage are accelerated around the cracked parts. This becomes an obstructive factor of longer usable life.

(4) The pitch or the like-impregnation treatment causes an increase in required time for production, etc., resulting in higher costs.

The aforementioned Patent Document 4 is intended to solve the problem (1) of the refractory product subjected to the pitch or the like-impregnation treatment, and provide a refractory product which is dense and excellent in corrosion-erosion resistance, without performing any pitch or the like-impregnation treatment.

However, the present inventors have found that problems with oxidation resistance, corrosion-erosion resistance, thermal shock resistance, etc., cannot be sufficiently solved only by densifying the microstructure of a refractory product by means of manipulation of fillability based on a combination of different particle sizes of raw material particles constituting the refractory product as in the Patent Document 4.

It is a first object of the present invention to solve the aforementioned problem (1), i.e., to provide a refractory product for a nozzle such as a SNP, which has durability equal to or better than that of a refractory product subjected to a pitch or the like-impregnation treatment, without generating any harmful volatile matter. It is a second object of the present invention to solve the aforementioned problems (2) and (3), i.e., to provide a refractory material for a nozzle such as a SNP, which has higher corrosion-erosion resistance and thermal shock resistance as compared to the refractory product subjected to the pitch or the like-impregnation treatment.

Solution to Technical Problem

The present invention provides a refractory product having features described in the following sections 1 to 5.
1. A refractory product which is not impregnated with tar or pitch, wherein it is characterized in that, in terms of values of physical properties of a sample of the refractory product as measured after heat-treating the sample in a non-oxidizing atmosphere at 1200° C., an apparent porosity is 7% or less; a total void volume of pores having a pore diameter of 1 μm or less is 80% or more of an integrated void volume of pores of the entire sample of the refractory product; and a gas permeability is $50 \times 10^{-17}$ m$^2$ or less.

2. The refractory product as described in the section 1, which is formed as a sliding nozzle plate, wherein a Weibull modulus (shape index) obtained from a three-point bending test of a sample cut out of a portion of the sliding nozzle plate other than a boss portion of the sliding nozzle plate is 15 or more.

3. The refractory product as described in the section 1, which is formed as a sliding nozzle plate, wherein, in a result of a three-point bending test of the sample of the refractory product, a value of an average strength ratio derived from dividing an average bending strength obtained from a boss portion of the sliding nozzle plate by an average bending strength obtained from a portion of the sliding nozzle plate other than the boss portion is 0.9 or more.

4. The refractory product as described in any one of the sections 1 to 3, which is produced by a process comprising kneading, shaping and heat treatment, wherein: with respect to 100% by volume of a total amount of raw material particles except for carbonaceous particles (except for carbon compound particles) and organic particles in a mixture to be subjected to the shaping (said raw material particles will hereinafter be referred to as "inorganic raw material particles"), a ratio (Vf/Vr) of a percent by volume Vf of a total amount of a part of the inorganic raw material particles having a particle size of 45 μm or less to a percent by volume Vr of a total amount of a part of the inorganic raw material particles having a particle size of 1 mm or more is 1.0 to 1.6, and a sum (Vf+Vr) of the percent by volume Vf and the percent by volume Vr is 50% by volume to 80% by volume; and a covering layer comprising a fine powder having a particle size of 45 μm or less together with an organic resin is formed on each surface of at least the part of the inorganic raw material particles having a particle size of 1 mm or more.

5. The refractory product as described in the section 4, wherein the mixture to be subjected to the shaping contains, with respect to 100% by mass of the entirety mixture: one selected from the chemical components consisting of $Al_2O_3$, $SiO_2$, MgO and $ZrO_2$ in an amount of 84% by mass to 97% by mass, or two or more selected from the chemical components consisting of $Al_2O_3$, $SiO_2$, MgO, $ZrO_2$, $Cr_2O_3$ and CaO, or one or more compounds or solid solutions of the two or more chemical components, in a total amount of 84% by mass to 97% by mass; one or more carbide components selected from SiC and $B_4C$ in a total amount of less than 4% by mass (including zero); one or more selected from the group consisting of Al, Si and Mg as metals in a total amount of 1% by mass to less than 7% by mass; and a carbon component in an amount of 1% by mass to less than 4% by mass;

6. The refractory product as described in any one of the sections 1 to 5, which is a sliding nozzle used for continuous casting of steel, or a nozzle installed on an upstream or downstream side of the sliding nozzle to form a molten steel-passing path.

The present invention will be described in detail.

The present inventors have found that suppression of the chemical damage requires densifying the microstructure of a refractory product to the level of apparent porosity obtainable by impregnation treatment, without performing impregnation treatment with pitch or the like in a production process of the refractory product.

Although conventional pitch or the like-impregnation treatment is capable of achieving densification of the microstructure of a refractory product, a substance existing among particles of the microstructure is changed to a pitch or the like-derived carbon component (so-called residual carbon) during casting. Such a carbon component exhibits an excellent effect of suppressing the penetration of slag components into the microstructure of the refractory product, but has a feature that it is easily dissolved into molten steel by contact with molten steel, or oxidized and lost by contact with oxidizing gas. The loss of the carbon component on the surface of the refractory product (e.g., SNP) leads to an increase in porosity or pore size, a rise in gas permeability, and thus quality deterioration such as decrease in strength of a sliding surface of the refractory product. As a result, infiltratability of foreign components such as molten steel and slag increases to promote surface roughness due to decrease in strength, and a gasification reaction, causing fusion/peeling.

In particular, the present inventors have found that it is most important for a nozzle such as a SNP to maintain low gas permeability by suppressing an increase in porosity or pore size, and a decrease in strength, during casting, in order to maintain a high level of corrosion-erosion resistance, etc., even under severe conditions where the nozzle is used for a long time or multiple times, i.e., in order to suppress the chemical damage of the nozzle to the extent that it can withstand the long-time or multi-time usage.

When specifying these desired functions by physical properties of a refractory product which is not impregnated with tar or pitch, more specifically by physical properties of a sample of the refractory product, as measured after heat-treating the sample in a non-oxidizing atmosphere at 1200° C., an apparent porosity is 7% or less; a total void volume of pores having a pore diameter of 1 μm or less is 80% or more of an integrated void volume of pores of the entire sample of the refractory product; and a gas permeability is $50 \times 10^{-17}$ m$^2$ or less.

The present inventors have also found that, in order to obtain such physical properties, it is necessary to allow refractory inorganic particles to lie as close as possible in a shaping step to extremely increase the density of a green body in the shaping step.

However, in a shaping method in which refractory aggregates come into direct contact with each other within a die, and therefore an internal frictional force becomes higher, the particles will be bridged together during the shaping, so that shapabilty (moldability) deteriorates, and it becomes impossible to increase the density of a resulting shaped body. At the same time, in a case where coarse aggregates come into contact with each other, the voids existing among the coarse aggregates will become large defects, and physical damage resistance will also deteriorate.

When such problems are solved by manipulating the particle size composition of raw material particles as in the aforementioned patent document 4, a certain degree of denseness to be evaluated by porosity can be obtained, but the internal microstructure of a refractory product has a configuration in which: relatively large open pores continuously extend up to a deep part of the refractory product; and a matrix microstructure among the particles is extremely thin, so that the particles lie mutually at extremely short distances, or there is no matrix micro structure among the particles, so that the particles lie in direct contact with each other.

A refractory product having such a microstructural configuration can withstand use immediately after production or at the early stage of casting to some extent. However, along with the elapse of usage time, it becomes impossible to suppress penetration of oxygen and molten steel-derived components into the microstructure of the refractory product, so that resistance to the chemical damage deteriorates, and resistance to the physical damage such as abrasion and mechanical fracture also deteriorates. The present inventors have found that, as a result of the above, durability deteriorates at a rate equal or nearly equal to that of deterioration in durability due to the phenomenon shown in the aforementioned problem (2) of the refractory product subjected to the pitch or the like-impregnation treatment, and further due to coarse particles lying in direct contact with each other, thermal expansion of the particles can be directly propagated to surrounding particles without being mitigated, causing deterioration in thermal shock resistance and mechanical fracture resistance.

Therefore, the present inventors further found that it is effective to allow the microstructure of the refractory product to have a configuration in which a matrix layer comprised of raw material particles having a particle size of less than 1 mm, or a carbonaceous composition, etc., is interposed between one of a plurality of inorganic raw material particles having a particle size of 1 mm or more and one of the remaining inorganic raw material particles, thereby preventing the one inorganic raw material particle from coming into direct contact with the one of the remaining inorganic raw material particles. This makes it possible to increase denseness, and corrosion-erosion resistance and physical damage suppression effect by suppression of the chemical damage, and increase sustainability of these functions.

With regard to the denseness and configuration of the microstructure of the refractory product of the present invention, it is preferable that they have high homogeneity. If the properties including the denseness have low homogeneity, it is impossible to ensure the chemical damage resistance and the physical damage resistance in the entire refractory product, particularly in a relatively large nozzle or the like, and ensure long-time sustainability or the like thereof.

Then, the present inventers have found that it is effective to evaluate and specify the homogeneity of the physical properties including the denseness in the microstructure of the refractory product by a Weibull modulus (shape index) obtained from a three-point bending test, and to set the Weibull modulus to 15 or more. That is, by setting the Weibull modulus to 15 or more, it becomes possible to obtain a significant effect of improving the chemical damage resistance and the physical damage resistance, i.e., solve the technical problem, and to attain long-time sustainability or the like thereof.

Figure 1:
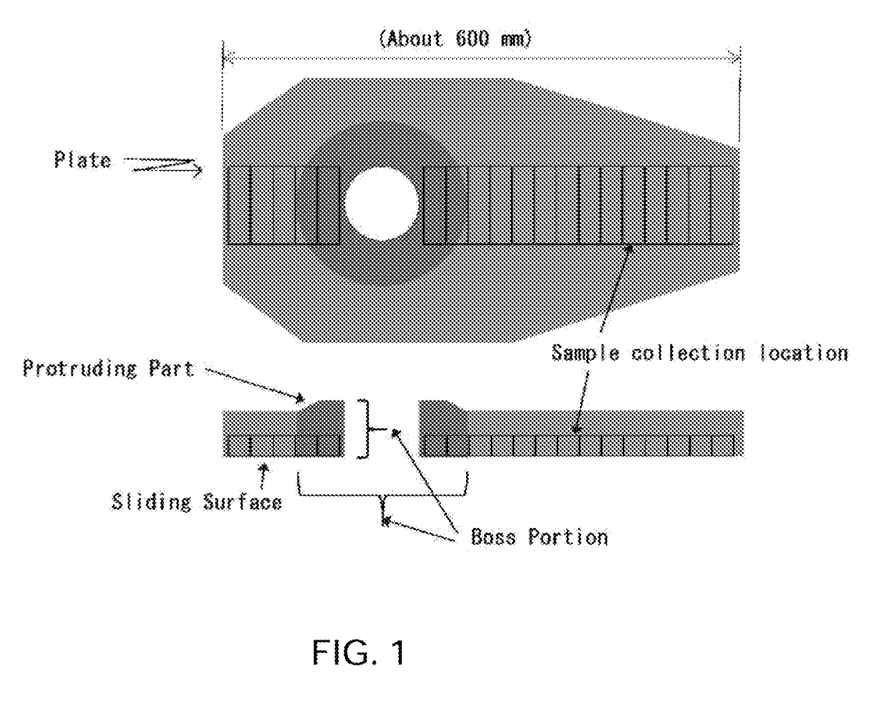
FIG. 1 is a diagram showing an example of the shape of a sliding nozzle plate, and an example of a collection location of samples to be cut out of the sliding nozzle plate to obtain bending strength and the Weibull modulus based on the bending strength (the sample collection location is the entire region extending from a long side to a short side of a sliding surface of the sliding nozzle plate).

In a case where the refractory product is formed as a sliding nozzle plate, the Weibull modulus is obtained from a three-point bending test of a sample cut out of a portion of the sliding nozzle plate other than a boss portion of the sliding nozzle plate. The term "boss portion" here means a part of a plate-shaped object protruding outwardly from either one of front and back surfaces thereof formed as parallel or approximately parallel planar surfaces. The "boss portion" in the present invention includes an area of the plate-shaped object located just below the protruding part (see FIG. 1). Further, it should be noted that a sample obtained from the boss portion (sample cut out of the boss portion) includes a sample partially comprised of the boss portion. That is, in FIG. 1, each of the fourth to seventh samples corresponds to the sample obtained from the boss portion (sample cut out of the boss portion).

In the aforementioned physical properties of the refractory product of the present invention, if the apparent porosity of the sample of the refractory product as measured after heat-treating the sample in a non-oxidizing atmosphere at 1200° C. is greater than 7%, or the gas permeability is greater than $50 \times 10^{-17}$ m$^2$, surface roughness and dissolved loss phenomenon due to infiltration phenomenon of slag, metal or the like become significant. Further, if the total void volume of pores having a pore diameter of 1 μm or less is less than 80% even when the apparent porosity is 7% or less, slag or metal infiltration or dissolved loss increases, i.e., the chemical damage resistance deteriorates.

The present inventors have found that, in order to obtain such a refractory product, the shaping is performed using a mixture composed of inorganic raw material particles whose particle size composition is set such that it mainly consists of coarse particles and fine particles by restraining an intermediate particle size, as described in detail later, and in which a covering layer exhibiting plasticity and containing a fine powder having a particle size of 45 μm or less, and an organic resin, is formed on a surface of each of at least a part of the inorganic raw material particles having a particle size of 1 mm or more. Thus, friction among the particles is reduced, and the particles come closer to each other, so that the density of a resulting shaped body is significantly improved.

Further, the present inventers have found that it is effective to adjust the particle size composition such that, with respect to 100% by volume of a total amount of inorganic raw material particles (including metals and carbide particles) except for carbonaceous particles (except for carbon compound particles) and organic particles in a mixture to be subjected to the shaping, the ratio (Vf/Vr) of a percent by volume Vf of fine particles having a particle size of 45 μm or less in the inorganic raw material particles to a percent by volume Vr of coarse particles having a particle size of 1 mm or more in the inorganic raw material particles is 1.0 to 1.6, and the sum (Vf+Vr) of the percent by volume Vf and the percent by volume Vr is 50% by volume to 80% by volume.

If the ratio (Vf/Vr) is less than 1.0, a coverage on the coarse particles is reduced, so that a frictional force during the shaping increase, resulting in failing to obtain desired denseness. On the other hand, if the ratio (Vf/Vr) is greater than 1.6, due to an excessive amount of fine particles, a contact area and a friction force among the fine particles becomes large increases during the shaping, resulting in failing to obtain desired denseness, and in deterioration of quality in terms of corrosion-erosion resistance and thermal shock resistance. If the sum (Vf+Vr) of the percents by volume is less than 50%, intermediate particles will increase. In this case, the friction force also increases during the shaping, resulting in failing to obtain desired denseness. On the other hand, if the sum (Vf+Vr) is greater than 80%, although it is possible to attain good shapabilty and obtain a dense product, an intermediate particle size fraction becomes extremely small, leading to the occurrence of a problem of deterioration in thermal shock resistance.

A commonly-used refractory product is indented to be formed as a refractory product having both excellent thermal shock resistance and excellent corrosion-erosion resistance, by mixing several types of inorganic raw material particles different in chemical component or mineral phase, wherein the raw materials are appropriately mixed within a particle size distribution from a coarse particle fraction (about 1 mm or more) to a fine particle fraction (submicron range), e.g., within a continuous distribution. However, in a refractory product production process in which a shaped body is formed using a mixture of raw materials different in particle size and specific gravity, component segregation and particle size segregation quite often occur within the microstructure of a refractory product, resulting in significant deterioration in the properties of the refractory product.

By contrast, in the refractory product of the present invention, with a view to preventing particle size segregation and component segregation in the microstructure of the refractory product, a covering layer comprising a fine powder having a particle size of 45 μm or less together with an organic resin is formed on a part or an entirety of the surfaces of the inorganic raw material particles having a particle size of 1 mm or more in the aforementioned particle size composition, whereby the shapability is extremely improved, thereby providing a dense and homogeneous microstructure with few defects. This makes it possible to obtain a refractory product which is dense without being subjected to pitch or the like-impregnation treatment, with a high Weibull modulus calculated from bending strength, and is capable of significantly reducing the failure probability of material strength to provide stable quality, thereby contributing greatly to not only the chemical damage resistance but also the physical damage resistance.

Meanwhile, although the Weibull modulus is used as an index of homogeneity, it also has an aspect of an evaluation criterion of the resistance to fracture. The present inventors have also found that in the case where the refractory product of the present invention is formed as a sliding nozzle plate, an average strength ratio derived from dividing an average strength of a boss portion of the sliding nozzle plate by an average strength of a portion of the sliding nozzle plate other than the boss portion can be used as an evaluation criterion of the resistance to edge dissolved loss and edge chipping which are known as damage forms of the boss portion.

In the present invention, the average strength ratio as the evaluation criterion of the resistance to the edge dissolved loss and the edge chipping is set to 0.9 or more, which is greater than the average strength ratio of a conventional refractory product, and closer to 1.

The refractory product of the present invention has a variation of, i.e., a distribution width of strength level, depending on locations of a shaped body due to the shape of the shaped body, which is less than that of the conventional refractory body. This shows that the mixture used for the present invention can more easily flow during the shaping, to allow a resulting shaped body to be more easily homogenized, as compared to a mixture used for the conventional refractory product.

The effect of the present invention regarding the homogeneity is produced by the flow property of the mixture. Thus, this effect can be obtained even if there are differences in size among a plurality of sliding nozzle plates, in dimensions among different locations of a sliding nozzle plate, etc.

The above means make it possible to provide a refractory product which is resistant to chemical damage and physical damage, beyond the properties of a refractory product subjected to the pitch or the like-impregnation treatment.

Effect of Invention

The present invention can provide a refractory product for a nozzle such as a SNP, which has durability equal to or better than that of a refractory product subjected to a pitch or the like-impregnation treatment, without generating any harmful volatile matter, and has higher corrosion-erosion resistance and thermal shock resistance as compared to the refractory product subjected to the pitch or the like-impregnation treatment.

Further, a production process of the refractory product of the present invention does not include the pitch or the like-impregnation treatment. Thus, the present invention makes it possible to shorten a required time for production, and suppress a rise in production cost.

BRIEF DESCRIPTION OF DRAWINGS

FIG. 4 is Table 3.

DESCRIPTION OF EMBODIMENTS

In a refractory product of the present invention, a mixture to be subjected to shaping contains, with respect to 100% by mass of the entire chemical components of the mixture: one selected from the chemical components consisting of $Al_2O_3$, $SiO_2$, MgO and $ZrO_2$ in an amount of 84% by mass to 97% by mass, or two or more selected from the chemical components consisting of $Al_2O_3$, $SiO_2$, MgO, $ZrO_2$, $Cr_2O_3$ and CaO, or one or more compounds or solid solutions of the two or more chemical components, in a total amount of 84% by mass to 97% by mass; one or more carbide components selected from SiC and $B_4C$ in a total amount of less than 4% by mass (including zero); one or more selected from the group consisting of Al, Si and Mg as metals in a total amount of 1% by mass to less than 7% by mass; and a carbon component in an amount of 1% by mass to less than 4% by mass.

The one or more carbide components selected from SiC and $B_4C$ have a function of suppressing mainly oxidation of the refractory product. The one or more selected from the group consisting of Al, Si and Mg as metals have a function of increasing the strength of the refractory product after heat treatment, and suppressing mainly oxidation of the refractory product.

The present invention will be described in detail by taking a SNP as an example.

Inorganic raw material particles usable in the present invention may be selected from commonly-used raw materials, such as $Al_2O_3$-based (including corundum, mullite, and sillimanite groups), $Al_2O_3$—MgO, $ZrO_2$, $Al_2O_3$—$ZrO_2$, $ZrO_2$-2 $Al_2O_3 \cdot SiO_2$, $ZrO_2$—CaO, $SiO_2$-based, SiC and $B_4C$ raw materials, each containing one or more minerals comprised of the one or the two or more selected from the above-mentioned chemical components, or one or more compounds or solid solutions of the two or more chemical components. In particular, the oxide particles are added to mainly give corrosion-erosion resistance and thermal shock resistance. For example, a refractory raw material for the corrosion-erosion resistance may be appropriately selected from components such as $Al_2O_3$-based, $Al_2O_3$—MgO, MgO and $ZrO_2$ raw materials, depending on steel type. For example, for steel for general structure, an $Al_2O_3$-based raw material which is a neutral oxide-based material is selected. On the other hand, for special steels containing basic inclusions, such as calcium-treated steel, high-manganese steel and high-oxygen steel, it is preferable to use a basic $Al_2O_3$—MgO or MgO raw material. Alternatively, it is also possible to use a $ZrO_2$-based raw material which is excellent in terms of corrosion-erosion resistance. Further, in a case where a thermal shock resistance property is required, improvement of durability can be expected by selecting a raw material having a hysteresis as a thermal expansion property or a raw material exhibiting a low expansion property, such as an $Al_2O_3$—$ZrO_2$ raw material, a $ZrO_2$-2 $Al_2O_3 \cdot SiO_2$ raw material, or an unstabilized $ZrO_2$ raw material. As long as an $Al_2O_3$-based raw material is used, a similar improvement can be expected, irrespective of whether it is brown alumina, white alumina, or calcined alumina, and irrespective of whether it is a fused raw material or a sintered raw material. This is also applied to mineral components or the like other than the $Al_2O_3$-based raw material.

Then, in a process of obtaining the refractory product of the present invention,
with respect to 100% by volume of the total amount of raw material particles except for carbonaceous particles (except for carbon compound particles) and organic particles in the mixture to be subjected to the shaping (inorganic raw material particles), the ratio (Vf/Vr) of a percent by volume Vf of the total amount of a part of the inorganic raw material particles having a particle size of 45 μm or less to a percent by volume Vr of the total amount of a part of the inorganic raw material particles having a particle size of 1 mm or more is set in the range of 1.0 to 1.6, and the sum (Vf+Vr) of the percent by volume Vf and the percent by volume Vr is set in the range of 50% by volume to 80% by volume.

Here, a method of calculating the percent by volume Vr and the percent by volume Vf will be described below. The volume of each of a plurality of raw materials is calculated by dividing the mass of the raw material derived from a mixing ratio table (mass ratio) by the density of the raw material, and, with respect to 100% by volume of the total volume of the raw materials, a percent by volume of an oversize fraction of each of the raw materials and a percent by volume of an undersize fraction of each of the raw materials, as measured after subjecting each of the raw materials to sieving with a 45 μm-mesh sieve, are defined as Vr and Vf, respectively. The density of each of the raw materials is measured by a constant volume expansion method.

SiC and/or $B_4C$ are added to improve mainly oxidation resistance of a material. Upon contact with oxidizing gas, these raw materials oxidizes by itself to undergo volume expansion to reduce a pore size and increase gas-flow resistance, thereby suppressing oxidation of the material. From a viewpoint of corrosion-erosion resistance, the amount of addition thereof is preferably set to less than 4% by mass in total. If one or more of them are added in an amount of 4% by mass or more, the corrosion-erosion resistance is likely to deteriorate.

The carbon component in the present invention is mainly composed of a carbon component derived from an organic resin having a high carbonization yield, such as phenol resin, pitch or the like, or furan resin, but may be composed of a carbon fine powder, such as a graphite fine powder, an amorphous graphite powder or a carbon black powder. The organic resin is added for the purpose of improving plasticity of the mixture during the shaping, and for formation of a carbonaceous bond by heat treatment, and development of strength by reaction with active metals. The carbon fine powder is supplementarily added to improve shapability as a solid lubricating filler with respect to the organic resin, and to suppress defects in the carbonaceous bond.

In anticipation of a rise in strength of and densification of the microstructure of a SNP, and an anti-oxidation function, it is possible to use an active metal such as Al, Si, or Mg in the form of a simple metal or an alloy thereof. Al can be used by itself. However, in a case where a shaped body is subjected to heat treatment at 800° C. or more in a production stage, it is preferable to use Al in combination with Si to suppress slaking of aluminum carbide. The total content of the active metal component is preferably set in the range of 1% by mass to less than 7% by mass. If the total content is less than 1% by mass, a sufficient effect cannot be expected, and if the total content is equal to or greater than 7% by mass, the thermal shock resistance deteriorates, resulting in increased physical damage.

As mentioned above, in a commonly-used refractory product, it have been sough to form a refractory product having both excellent thermal shock resistance and excellent corrosion-erosion resistance, by mixing several types of inorganic raw material particles different in chemical component or mineral phase, wherein the raw materials are appropriately mixed within a particle size distribution from a coarse particle fraction (+1 mm) to a fine particle fraction (submicron fraction) to form an inhomogeneous microstructure. However, it is known that in a refractory product production process in which a shaped body is formed using a mixture of raw materials different in particle size and specific gravity, component segregation and particle size segregation quite often occur within the microstructure of a refractory product, resulting in significant deterioration in the properties of the refractory product.

The present inventors have found that formation of a bond part in which a network develops such that it encloses coarse particles in the microstructure reduces the failure probability of material strength and improves the physical damage resistance and the chemical damage resistance. Therefore, in the present invention, a microstructure comprising a resin part and a fine powder incorporating the fine particle fraction of the inorganic raw material particles is formed to uniformly cover all around coarse particles of the inorganic raw material particles, so that it becomes possible to reduce a frictional force among the coarse particles in the shaping step and obtain a dense microstructure in which the raw material particles lie close to each other, and to obtain a homogeneous refractory microstructure in which component segregation or particle size segregation is less likely to occur.

The carbon component containing resin-derived carbon is preferably contained in an amount of 1% by mass to less than 4% by mass. If the content is less than 1% by mass, it becomes difficult to obtain a sufficient bond part, and if the content is equal to or greater than 4% by mass, roughening and degradation of the microstructure is more likely to occur due to elution of the carbon content into molten steel, oxidation of the carbon content, etc., leading to deterioration in durability.

In the present invention, the aforementioned technique is used to maximize shapability and form a shaped body in which the inorganic raw material particles lie as close as possible in the shaping step, thereby reducing the apparent porosity of a just-burned product to 7% or less.

If the apparent porosity is greater than 7%, surface roughness due to infiltration phenomenon of slag, metal or the like becomes significant. Further, even when the apparent porosity is equal to or less than 7%, the total void volume of pores having a pore diameter of 1 μm or less is important. Specifically, it has been found that the total void volume of pores having a pore diameter of 1 μm or less needs to be 80% or more of the integrated void volume of pores of the entire refractory product. It has been confirmed that if the total void volume of pores having a pore diameter of 1 μm or less is less than 80%, the chemical damage resistance deteriorates due to increases in slag and metal infiltration, and dissolved loss.

Next, a production method for a SNP according to one embodiment of the present invention will be described. A mixture having a particle size distribution in the aforementioned range is divided into a coarse particle size fraction (particle size of 1 mm or more), an intermediate particle size fraction (particle size of greater than 45 μm to less than 1 mm), a fine particle size fraction (particle size of 45 μm or less), and a binder (organic resin), and each of the divided parts is subjected to weighting. After putting all of the coarse particle size fraction and the intermediate particle size fraction of the inorganic raw material particles into a commonly-used mixer such as a pan-type mixer, an Eirich mixer, a planetary mixer, or a high-speed mixer, about 50 to 80% of the entire binder is added thereto, and the resulting mixture will be kneaded for a given time. Lastly, the remaining binder and all of the fine particle size fraction are added, and the resulting mixture is kneaded such that the coarse, intermediate and fine particle size fractions of the inorganic raw material particles and the organic resin become a homogeneous mixture. The mixture is kneaded for a given time until it is densified, and a volatile matter content reaches a level required for shaping. As a binder to be added in this process, it is possible to use an organic resin having high carbonization yield, such as phenol resin, pitch or the like, and furan resin. Any form of organic resin can be used, such as liquid form, liquid+powder form, or powder form, as long as it enables a binder effect, fixing of the fine powder layer, and densification. The amount of addition of the organic resin is in the range of 0.5 to 10% by mass, preferably in the range of 1 to 5% by mass, with respect to and in addition to 100% by mass of the raw material mixture. The kneaded mixture obtained in the above manner is formed into a given shape using a normally-employed press machine such as an oil press or friction press.

A kneading duration necessary to allow the mixture to be densified while a volatile matter content reaches a level required for shaping may be appropriately optimized depending on various conditions in a kneading machine, a shaping machine, a kneading step, a shaping step, etc.

A resulting shaped body is subjected to curing and drying at a temperature of 100 to 300° C., and then subjected to burning in a non-oxidizing atmosphere at 500 to 1400° C., preferably 850 to 1300° C.

EXAMPLES

Experimental Example A

Experimental Example A is an example in which each of the apparent porosity, the percent of the total void volume of pores having a pore diameter of 1 μm or less and the gas permeability was changed to check an influence on the thermal shock resistance, the surface roughness, the corrosion-erosion resistance, etc.

A raw material for the refractory product in Experimental Example A comprises: a primary component consisting of the most common $Al_2O_3$-based artificial particles composed of corundum; $Al_2O_3$—$ZrO_2$ based particles, a SiC powder, a $B_4C$ powder and a metal Al powder, wherein a mixture to be subjected to shaping was adjusted such that the ratio (Vf/Vr) derived by the aforementioned method was set in the range of 1.0 to 1.6, and the sum (Vf+Vr) derived by the aforementioned method was set in the range of 50 to 80% by volume, and wherein these values became approximately the same in each sample.

The same is also applied to the below-mentioned Experimental Examples B to D.

Chemical components (% by mass) of an inorganic equivalent, except for volatile matters, in the mixture in Experimental Examples A to D are written in Tables 1 to 4. With regard to resins, the amount of fixed carbon was calculated as the amount of carbon component.

Each evaluation method is as follows. The same is also applied to Experimental Examples B, C and D.

[Thermal Shock Resistance]

Pig iron was melted in a high-frequency induction furnace, and kept at 1600° C. Then, a 40-mm square prism-shaped sample (which is equivalent to a sample of the refractory product, wherein the sample has been subjected to heat treatment in a non-oxidizing atmosphere at 1200° C. The same is also applied to the following description) was immersed in the molted pig iron for 3 minutes and then subjected to air cooling. After repeating the above process five times, a surface state of the sample was observed. As a result, when almost no crack was observed, when a crack was observed on the surface, and when a crack developed to cause peel-off, the sample was evaluated as ○ (Excellent), Δ (Good) and × (NG), respectively.

[Surface Roughness]

Two 20×20×40 mm samples were heated to a temperature equal to or higher than a melting point of synthetic slag in which $CaO/Al_2O_3$ is 2, and fused together under pressure to prepare a test piece for a compression shear test. A shearing force was applied to the fused part to cause breaking. As a result, when the matrix of one of the samples was peeled off, the sample was evaluated as × (NG), and when peel-off occurred at a slag interface and a matrix microstructure was kept healthy, the sample was evaluated as 0.

[Corrosion-Erosion Resistance (to FeO)]

In a high-frequency induction furnace, molten iron and FeO as a corrosive/erosive agent were put in a crucible lined by a sample, and the corrosion-erosion resistance was evaluated by a corrosion-erosion rate. When the corrosion-erosion rate is 5 μm/min, when the corrosion-erosion rate is greater than 5 to less than 10 μm/min and when the corrosion-erosion rate is equal to or greater than 10 μm/min, the sample was evaluated as ○ (Excellent), Δ (Good) and × (NG), respectively.

[Corrosion-Erosion Resistance (to CaO)]

In a high-frequency induction furnace, molten iron and CaOas a corrosive/erosive agent were put in a crucible lined by a sample, and the corrosion-erosion resistance was evaluated by a corrosion-erosion rate. When the corrosion-erosion rate is 5 μm/min, when the corrosion-erosion rate is greater than 5 to less than 10 μm/min and when the corrosion-erosion rate is equal to or greater than 10 μm/min, the sample was evaluated as ○ (Excellent), Δ (Good) and × (NG), respectively.

[Comprehensive Evaluation]

A sample in which all the items were evaluated as ○ (Excellent) or Δ (Good) was comprehensively evaluated as ○ (Acceptable), and a sample in which even one of the items was evaluated as × (NG) was comprehensively evaluated as × (Unacceptable)

The apparent porosity, the percent of the total void volume of pores having a pore diameter of 1 μm or less (pore size distribution), the gas permeability and the Weibull modulus were derived, respectively, by: JIS R 2205: 1992 (Testing method for apparent porosity, water absorption specific gravity of refractory bricks); JIS R 1655: 2003 (Test methods for pore size distribution of fine ceramic green body by mercury porosimetry); JIS R 2115: 2008 (Testing method for permeability to gases of refractory products); and JIS R 1625: 2010 (Weibull statistics of strength data for fine ceramics), using a refractory sample having a sample shape of 18×18×80 mm, subjected to heat treatment in a non-oxidizing atmosphere at 1200° C. The n number for deriving the Weibull modulus of a sample cut out of a portion of the SNP other than a boss portion of the SNP was set to 15 or more.

A covered state of particles having a particle size of 1 mm or more was determined by microscopic observation.

Figure 2:
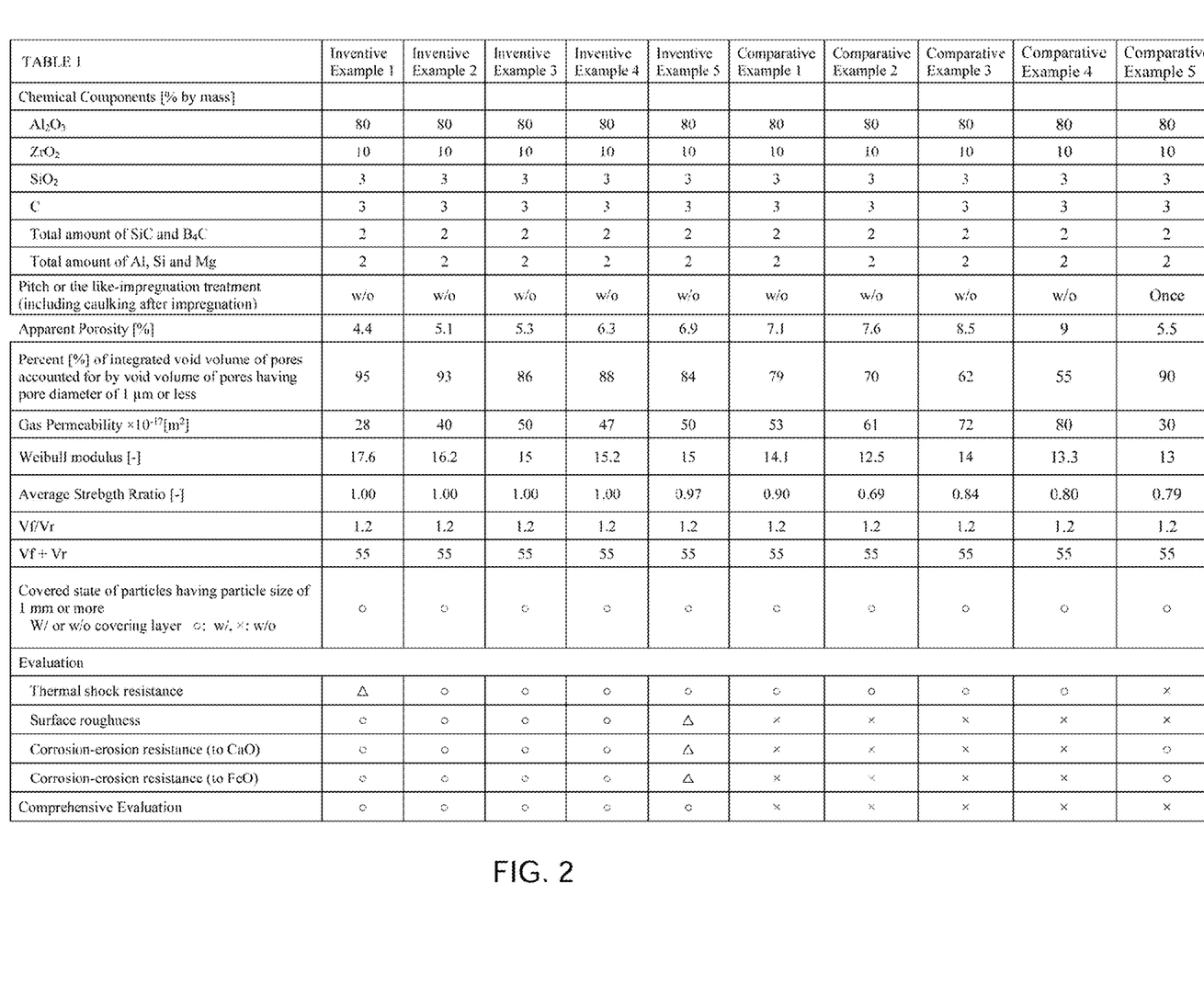
FIG. 2 is Table 1.

The configuration and result of each Example are shown in Table 1. TABLE 1 is shown in FIG. 2.

In Inventive Examples satisfying the following requirements: (1) the apparent porosity is 7% or less; (2) the total void volume of pores having a pore diameter of 1 μm or less is 80% or more of the integrated void volume of pores of the entire sample of the refractory product; and (3) the gas permeability is $50\times10^{-17}$ m$^2$ or less, each of Inventive Examples had a result superior to Comparative Example 5 which is a refractory product subjected to the pitch or the like-impregnation treatment, in terms of all the thermal shock resistance, the surface roughness, the corrosion-erosion resistance (to FeO), and the corrosion-erosion resistance (to CaO).

Further, Table 1 shows that it is also possible to obtain a Weibull modulus of 15 or more, and obtain high homogeneity. In Comparative Examples each failing to satisfy all the requirements (1), (2) and (3), the Weibull modulus was less than 15.

Experimental Example B

Experimental Example B is an example in which each of the apparent porosity and the percent of the total void volume of pores having a pore diameter of 1 μm or less the parameters was changed to check an influence on the thermal shock resistance, the surface roughness, the corrosion-erosion resistance, etc.

Each Example in Experimental Example B was obtained by adjusting the ratio (Vf/Vr).

Figure 3:
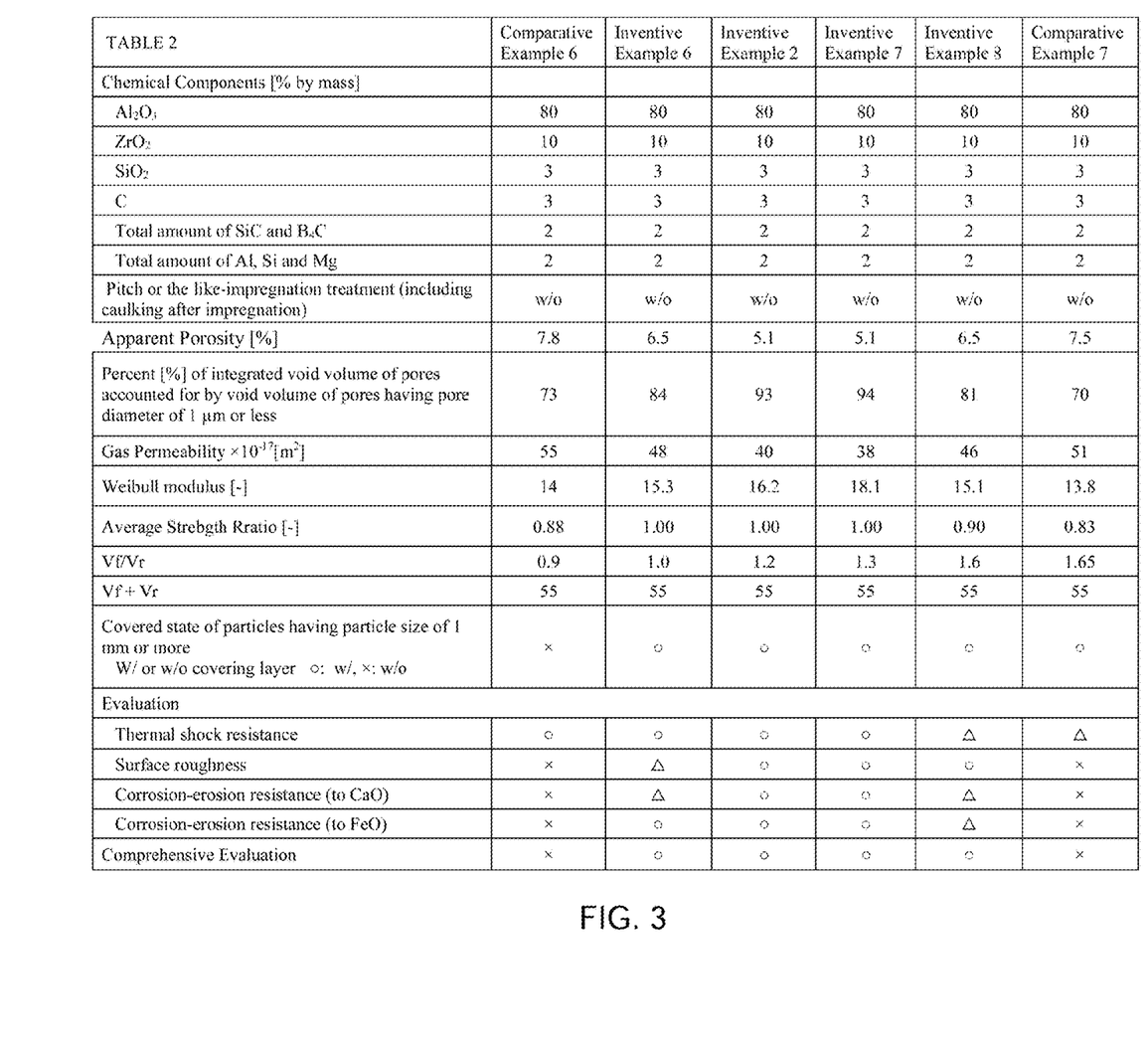
FIG. 3 is Table 2.

The configuration and result of each Example are shown in Table 2. TABLE 2 is shown in FIG. 3.

Table 2 shows that in conjunction with a change in the ratio (Vf/Vr), each of the apparent porosity, the percent of the total void volume of pores having a pore diameter of 1 μm or less and the gas permeability also changes. Each of Inventive Examples satisfying that the ratio (Vf/Vr) is 1.0 to 1.6 was comprehensively evaluated as Acceptable (evaluated as ○ (Excellent) or Δ (Good) in terms of all the thermal shock resistance, the surface roughness, the corrosion-erosion resistance (to FeO), and the corrosion-erosion resistance (to CaO)), or had a result superior to Comparative Example 5 (Table 1) which is a refractory product subjected to the pitch or the like-impregnation treatment.

On the other hand, each of Comparative Examples 6 and 7 in which the ratio (Vf/Vr) does not fall within the range (of 1.0 to 1.6) as defined in the appended claims was evaluated as × (NG=Unacceptable) in terms of all the surface roughness, the corrosion-erosion resistance (to FeO), and the corrosion-erosion resistance (to CaO)). Further, Comparative Examples 6 and 7 Table 1 failed to obtain a Weibull modulus of 15 or more.

Experimental Example C

Experimental Example C is an example in which each of the apparent porosity and the gas permeability was changed to check an influence on the thermal shock resistance, the surface roughness, the corrosion-erosion resistance, etc.

Each Example in Experimental Example C was obtained by adjusting the sum (Vf+Vr).

The configuration and result of each Example are shown in Table 3. TABLE 3 is shown in FIG. 4.

Table 3 shows that in conjunction with a change in the sum (Vf+Vr), the gas permeability also changes. Each of Inventive Examples satisfying that the sum (Vf+Vr) is 50% by volume to 80% by volume was comprehensively evaluated as Acceptable (evaluated as ○ (Excellent) or Δ (Good) in terms of all the thermal shock resistance, the surface roughness, the corrosion-erosion resistance (to FeO), and the corrosion-erosion resistance (to CaO)), or had a result superior to Comparative Example 5 (Table 1) which is a refractory product subjected to the pitch or the like-impregnation treatment.

On the other hand, each of Comparative Examples 8, 9 and 10 in which the sum (Vf+Vr) does not fall within the range (of 50% by volume to 80% by volume) as defined in the appended claims was evaluated as × (NG=Unacceptable) in terms of all the surface roughness, the corrosion-erosion resistance (to FeO), and the corrosion-erosion resistance (to CaO)). Further, Comparative Example 8 failed to obtain a Weibull modulus of 15 or more.

Experimental Example D

Experimental Example D is an example in which chemical components of a refractory product, i.e., a composition constituting the refractory product, were changed to check an influence on the thermal shock resistance, the surface roughness, the corrosion-erosion resistance, etc.

Figure 5:
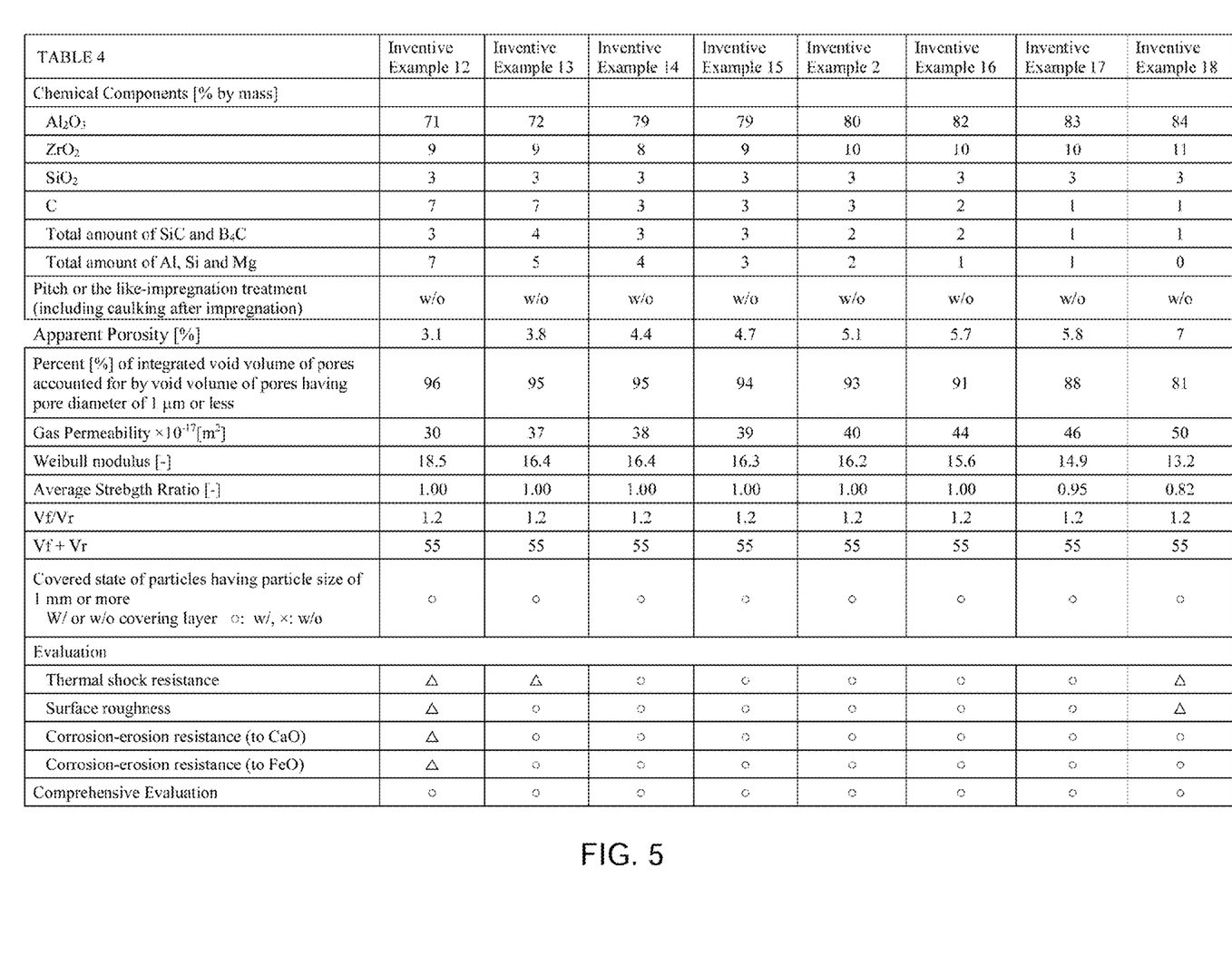
FIG. 5 is Table 4.

Each Example in Experimental Example D was obtained by adjusting a mixing rate of each raw material (including resin) such that a composition of a sample of the refractory product becomes equal to the composition as described in Table 4 as measured after heat-treating the sample in a non-oxidizing atmosphere at 1200° C.

In this mixing rate of each raw material, the total amount of SiC and $B_4C$ was set to a percent obtained by adding a percent to be reduced by heat treatment, and the total amount of Al, Si and Mg is set to a percent obtained by adding a percent to be reduced by heat treatment, to each component as a metal.

Since each of SiC and $B_4C$ has a function of adjusting oxidation resistance and strength of a refractory product mainly in a high-temperature region, they were handled as one raw material (total amount). Further, since each of Al, Si and Mg as metals has a function of adjusting oxidation resistance and strength of a refractory product mainly from a low-temperature region, they were handled as one raw material (total amount).

The remnant thereof mainly comprised oxide raw material particles such as $Al_2O_3$ raw material particles (main mineral: corundum), and $ZrO2$-containing $Al_2O_3$-based raw material particles.

The amount of C (carbon) as shown in Table 4 includes a carbonaceous substrate such as a particle, and resin, i.e., binder-derived C (carbon) (this is also applied to Table 1 to 3).

Here, for example, when the refractory product of the present invention is applied to a SNP, the composition and type of molten steel, the type and content of inclusions in molten steel, or the like exert an influence on damage form and durability of the refractory product.

In this Experimental Example, the most common component (mainly $Al_2O_3$-based raw material) was used as a main component. However, depending on individual conditions such as the aforementioned casting conditions, it is possible to select various raw materials inclosing: one selected from the chemical components consisting of $Al_2O_3$, $SiO_2$, MgO and $ZrO_2$; two or more selected from the chemical components consisting of $Al_2O_3$, $SiO_2$, MgO, $ZrO_2$, $Cr_2O_3$ and CaO; and one or more compounds or solid solutions of the two or more chemical components.

The configuration and result of each Example are shown in Table 4. TABLE 4 is shown in FIG. 5.

Each of Inventive Examples was evaluated as ○ (Acceptable) in the comprehensive evaluation.

However, with respect to 100% by mass of the entire refractory product, in Inventive Example 12 in which the amount of carbon (carbon component) is as large as 7% by mass, and the total amount of the metal components is 7% by mass, had a result in which the thermal shock resistance, the surface roughness, the corrosion-erosion resistance to CaO and the corrosion-erosion resistance to FeO were slightly inferior.

Similarly, in Inventive Example 13 in which the amount of carbon (carbon component) is as large as 7% by mass, and the total amount of the carbides is 5% by mass, had a result in which the thermal shock resistance was slightly inferior.

Further, in Inventive Example 18, since the amount of carbon (carbon component) is close to the lower limit, an increase in the surface roughness that might be caused by oxidation of the carbon component adjacent to the surface of the refractory product or insufficient strength of a part of the surface of the refractory product was observed.

The invention claimed is:

1. A refractory product which is not impregnated with tar or pitch, wherein in terms of values of physical properties of a sample of the refractory product as measured after heat-treating the sample in a non-oxidizing atmosphere at 1200° C., an apparent porosity is 7% or less;

a total void volume of pores having a pore diameter of 1 µm or less is 80% or more of an integrated void volume of pores of the entire sample of the refractory product; and a gas permeability is $50 \times 10^{-17}$ m$^2$ or less.

2. The refractory product as claimed in claim 1, which is formed as a sliding nozzle plate, wherein a Weibull modulus (shape index) obtained from a three-point bending test of a sample cut out of a portion of the sliding nozzle plate other than a boss portion of the sliding nozzle plate is 15 or more.

3. The refractory product as claimed in claim 1, which is formed as a sliding nozzle plate, wherein, in a result of a three-point bending test of the sample of the refractory product, a value of an average strength ratio derived from dividing an average bending strength obtained from a boss portion of the sliding nozzle plate by an average bending strength obtained from a portion of the sliding nozzle plate other than the boss portion is 0.9 or more.

4. The refractory product as claimed in claim 1, which is produced by a process comprising kneading, shaping and heat treatment, wherein:

with respect to 100% by volume of a total amount of raw material particles except for carbonaceous particles (except for carbon compound particles) and organic particles in a mixture to be subjected to the shaping (said raw material particles will hereinafter be referred to as "inorganic raw material particles"), a ratio (Vf/Vr) of a percent by volume Vf of a total amount of a part of the inorganic raw material particles having a particle size of 45 µm or less to a percent by volume Vr of a total amount of a part of the inorganic raw material particles having a particle size of 1 mm or more is 1.0 to 1.6, and a sum (Vf+Vr) of the percent by volume Vf and the percent by volume Vr is 50% by volume to 80% by volume; and a covering layer comprising a fine powder having a particle size of 45 µm or less together with an organic resin is formed on each surface of at least the part of the inorganic raw material particles having a particle size of 1 mm or more.

5. The refractory product as claimed in claim 4, wherein the mixture to be subjected to the shaping contains, with respect to 100% by mass of the entirety mixture:

one selected from the chemical components consisting of $Al_2O_3$, $SiO_2$, MgO and $ZrO_2$ in an amount of 84% by mass to 97% by mass, or two or more selected from the chemical components consisting of $Al_2O_3$, $SiO_2$, MgO, $ZrO_2$, $Cr_2O_3$ and CaO, or one or more compounds or solid solutions of the two or more chemical components, in a total amount of 84% by mass to 97% by mass;

one or more carbide components selected from SiC and $B_4C$ in a total amount of less than 4% by mass (including zero);

one or more selected from the group consisting of Al, Si and Mg as metals in a total amount of 1% by mass to less than 7% by mass; and a carbon component in an amount of 1% by mass to less than 4% by mass.

6. The refractory product as claimed in claim 1, which is a sliding nozzle used for continuous casting of steel, or a nozzle installed on an upstream or downstream side of the sliding nozzle to form a molten steel-passing path.

* * * * *